United States Patent [19]

Nakamatsu et al.

[11] Patent Number: 5,183,892
[45] Date of Patent: Feb. 2, 1993

[54] ANTHRAPYRIDONE COMPOUNDS

[75] Inventors: Toshio Nakamatsu, Osaka; Masanobu Terao, Hyogo; Shigetoshi Muneishi, Hyogo; Norio Kometani, Hyogo; Yoshiaki Hayashi, Osaka, all of Japan

[73] Assignees: Sumitomo Chemical Company, Limited, Osaka; Daili Chemical Company, Limited, Hyogo, both of Japan

[21] Appl. No.: 621,236

[22] Filed: Nov. 30, 1990

Related U.S. Application Data

[63] Continuation-in-part of Ser. No. 384,769, Jul. 25, 1989, abandoned.

[30] Foreign Application Priority Data

Jul. 29, 1988 [JP] Japan .................. 63-191918

[51] Int. Cl.$^5$ ............................................ C07D 221/18
[52] U.S. Cl. .................................... 546/76; 106/287.2
[58] Field of Search ............................................ 546/76

[56] References Cited

U.S. PATENT DOCUMENTS

| | | | |
|---|---|---|---|
| 2,300,453 | 11/1942 | Lodge ........................... | 260/278 |
| 3,076,808 | 2/1963 | Blout et al. ................... | 260/278 |
| 3,126,280 | 3/1964 | Blout et al. ................... | 96/29 |
| 4,902,798 | 2/1990 | Nakamatsu et al. ........... | 546/76 |

FOREIGN PATENT DOCUMENTS 63-139170  12/1986  Japan .

OTHER PUBLICATIONS

Chem. Abst. 92:180967b, 1980.
Zh. Org. Khim. 16:230-231, 1980.
Chem. Abst. 97:164532d, 1982.
Chem. Abst. 101:191737g, 1984.
Chem. Abst. 78:71882k, 1973.
Chem. Abst. 93:114182m, 1980.

*Primary Examiner*—Nicholas S. Rizzo
*Attorney, Agent, or Firm*—Darby & Darby

[57] ABSTRACT

An anthrapyridone compound of the following formula (I), which is useful for coloring synthetic resins:

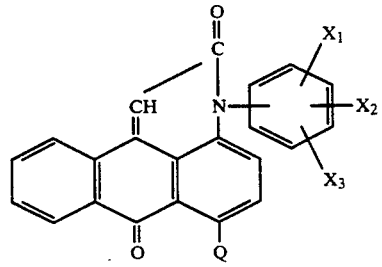

wherein Q is $-NH_2$, $-NHCH_3$ or $-NHCOZ$ where Z is phenyl or alkyl which may be substituted; $X_1$, $X_2$ and $X_3$ are each hydrogen, halogen, alkyl, alkoxy, hydroxy, $-NHCOR^1$, $-CONR^2R^3$m $-COR^4$, $-COOR^5$, $-SO_2R^6$ or $-SO_2NR^7R^8$ where $R^1$ and $R^4$ are each $C_{1-4}$ alkyl, $R^2$ and $R^3$ are each hydrogen or $C_{1-4}$ alkyl, $R^5$ and $R^6$ are each alkyl or hydroxyalkyl and $R^7$ and $R^8$ are each hydrogen or $C_{1-4}$ alkyl, with proviso that when Q is $-NHCH_3$, $X_1$, $X_2$ and $X_3$ are each hydrogen, halogen, alkoxy, hydroxy, $-NHCOR^1$, $-CONR^2R^3$, $-COR^4$, $-COOR^5$, $-SO_2R^6$ or $-SO_2NR^7R^8$.

Process for producing the anthrapyridone compound is also provided.

11 Claims, No Drawings

ANTHRAPYRIDONE COMPOUNDS

This application is a continuation-in-part application of Ser. No. 384,769, filed on Jul. 25, 1989, now abandoned.

The present invention relates to an anthrapyridone compound and a novel process for producing the same.

Anthrapyridone compounds have been used as coloring agents for synthetic resins and acid dyes and examples thereof are those which are represented by the following formulas (Japanese Patent Kokai No. 63-139170). These anthrapyridone compounds are excellent in heat resistance when used as a coloring agent for synthetic resins and further can dye wool in bright red color. However, they are produced from 4-bromo-1,9-N-methylanthrapyridone which is obtained through five steps starting from anthraquinones and thus are expensive and are limited in their use.

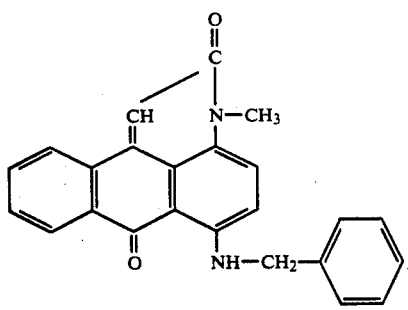

(Known compound A)

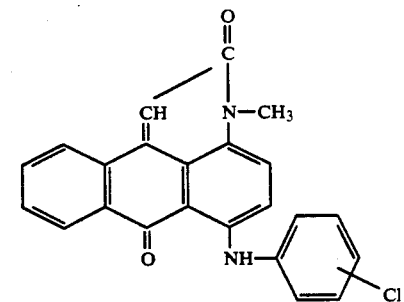

(Known compound B)

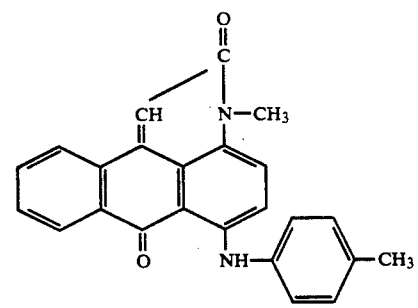

(Known compound C)

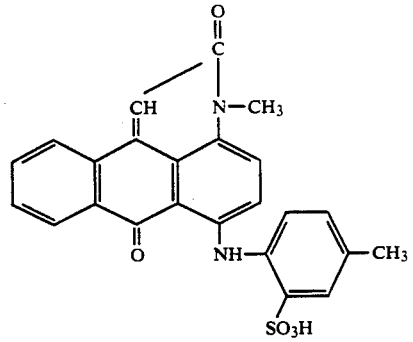

(Known compound D)

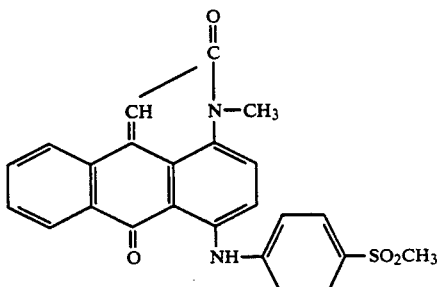

(Known compound E)

The present inventors have conducted intensive research to obtain anthrapyridone compounds by industrially advantageous process without using expensive 4-bromo-1,9-N-methylanthrapyridone and have attained to the present invention.

The present invention provides a process for producing an anthrapyridone compound represented by the formula (1):

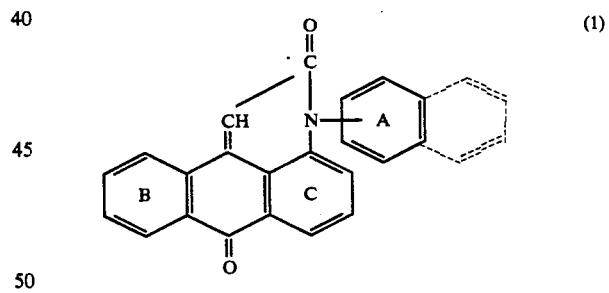

(1)

wherein A is a benzene ring or a naphthalene ring which may have a substituent and aromatic rings B and C may have a substituent, which comprises reacting an α-haloanthraquinone compound represented by the formula (2):

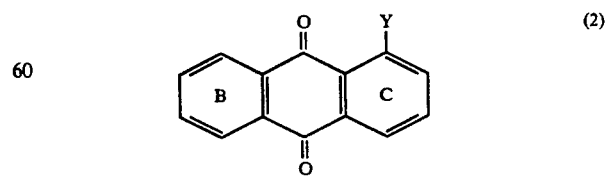

(2)

wherein Y represents a halogen atom and B and C are as defined above, with an amide compound represented by the formula (3):

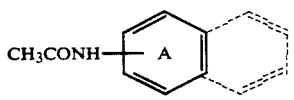

wherein A is as defined above, to obtain a compound represented by the formula (4):

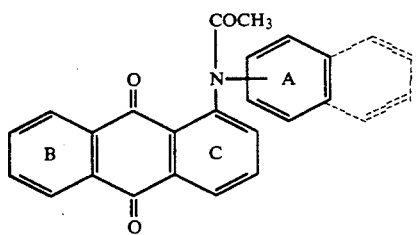

wherein A, B and C are as defined above and then subjecting this compound to ring closure reaction.

The present invention also provides an anthrapyridone compound represented by the following formula (I):

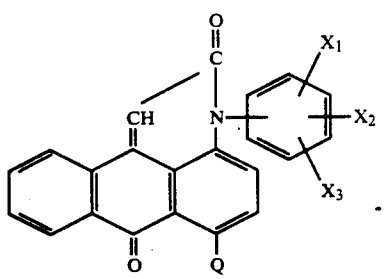

wherein Q is —NH$_2$, —NHCH$_3$ or —NHCOZ where Z is phenyl or alkyl which may be substituted; X$_1$, X$_2$ and X$_3$ are each hydrogen, halogen, alkyl, alkoxy, hydroxy, —NHCOR$^1$, —CONR$^2$R$^3$, —COR$^4$, —COOR$^5$, —SO$_2$R$^6$ or —SO$_2$NR$^7$R$^8$ where R$^1$ and R$^4$ are each C$_{1-4}$ alkyl, R$^2$ and R$^3$ are each hydrogen or C$_{1-4}$ alkyl, R$^5$ and R$^6$ are each alkyl or hydroxyalkyl and R$^7$ and R$^8$ are each hydrogen or C$_{1-4}$ alkyl, with proviso that when Q is —NHCH$_3$, X$_1$, X$_2$ and X$_3$ are each hydrogen, halogen, alkoxy, hydroxy, —NHCOR$^1$, —CONR$^2$R$^3$, —COR$^4$, —COOR$^5$, —SO$_2$R$^6$ or —SO$_2$NR$^7$R$^8$.

Among these anthrapyridone compounds, preferred are those represented by the following formulas (II) to (IV):

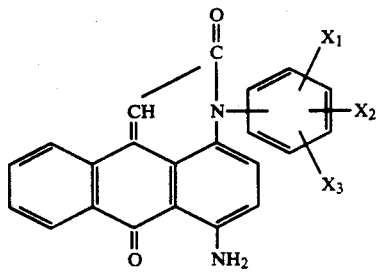

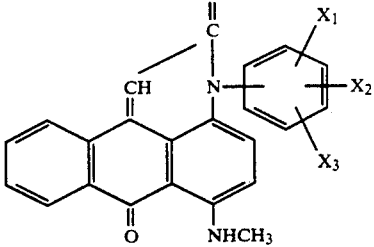

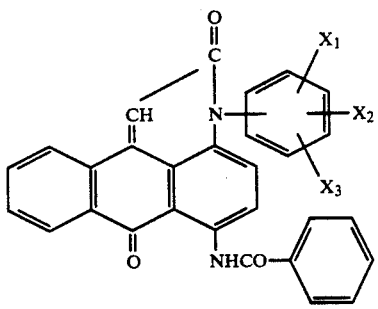

wherein X$_1$, X$_2$ and X$_3$ are as defined above.

In the above compounds of the formulas (II) to (IV), particularly preferred are those having hydrogen atoms as X$_1$ and X$_2$, and —NHCOR$^1$ and —SO$_2$NR$_7$R$^8$ as X$_3$, wherein R$^1$, R$^7$ and R$^8$ are as defined above, preferably each C$_{1-4}$ alkyl such as methyl.

The benzene ring and naphthalene ring represented by A may be unsubstituted or substituted once, twice or three times by, for example, halogen such as chlorine, bromine etc., nitro, hydroxy, cyano, alkyl, alkoxy, phenyl, phenoxy, amino, aminocarbonyl, alkylsulfonyl, aminosulfonyl, carboxy and sulfo.

The aromatic rings B and C may be unsubstituted or substituted once to six times by, for example, halogen such as chlorine, bromine etc., nitro, hydroxy, cyano, alkyl, alkoxy, phenyl, phenoxy, amino, sulfo and carboxy.

In the above substituents on the rings A, B and C, the alkyl and alkyl moiety in the alkoxy and alkylsulfonyl are each one having 1 to 4 carbon atoms, and may be unsubstituted or substituted by, for example, hydroxy and halogen such as chlorine, bromine etc. The phenyl and phenoxy may be each unsubstituted or substituted by, for example, C$_{1-4}$ alkyl and C$_{1-4}$ alkoxy. The amino and amino moiety in the aminocarbonyl and aminosulfonyl may be each unsubstituted or substituted by, for example, C$_{1-4}$ alkyl, acyl such as C$_{1-4}$ alkylcarbonyl, benzoyl, toluoyl etc., and phenyl.

These substituents are not critical as far as they are inactive during preparation of the anthrapyridone compounds represented by the formula (1).

In the above formula (I), the alkyl and alkyl moiety in the alkoxy and hydroxyalkyl, which are not specified, are each lower alkyl such as those having 1 to 4 carbon atoms, and with respect to the symbol Z, the phenyl may be unsubstituted or substituted by, for example, halogen such as chlorine, bromine etc., hydroxy and C$_{1-4}$ alkyl, and the alkyl may be unsubstituted or substituted by, for example, halogen such as chlorine, bromine etc., and hydroxy.

In carrying out the process of the present invention, the condensation reaction between the α-haloanthraquinone compound (2) and the amide compound (3) is generally called Ullmann's reaction and can be usually carried out preferably in the presence of water or an organic solvent at a reaction temperature of at least 30° C., preferably 50°–300° C., more preferably 100°–200° C., preferably in the presence of metallic copper or copper compound.

The metallic copper and copper compounds used in the above condensation reaction include, for example, copper halides such as cuprous chloride and cupric chloride, copper oxide, copper sulfate and copper acetate. These may be used each alone or in combination thereof in an amount of about 0.01 to 0.2, preferably 0.03 to 0.1 mole per mole of the compound (2).

The organic solvents used in the condensation reaction include, for example, halobenzenes such as monochlorobenzene and o-dichlorobenzene, alkyl benzenes such as toluene and xylene, and polar solvents such as dimethylformamide, sulfolane and dimethyl sulfoxide. These may be used each alone or in combination thereof.

The condensation reaction can be favorably performed by using an acid-binding agent.

The acid-binding agent includes alkali metal carbonates such as potassium carbonate, sodium carbonate, potassium hydrogencarbonate, and sodium hydrogencarbonate and organic acid salts such as sodium acetate, and can be used in an amount of about 1 to 5, preferably 2 to 3.5 moles per mole of the compound (2).

Examples of the α-haloanthraquinone compounds (2) are as follows.
1-Chloroanthraquinone,
1-Bromoanthraquinone,
1,5-Dichloroanthraquinone,
1,8-Dichloroanthraquinone,
1,4,5,8-Tetrachloroanthraquinone,
1-Bromo-2-aminoanthraquinone,
1-Bromo-4-aminoanthraquinone,
1-Bromo-4-benzoylaminoanthraquinone
1-Chloro-5-benzoylaminoanthraquinone,
1-Bromo-4-acetylaminoanthraquinone,
1-Bromo-4-propionylaminoanthraquinone,
1-Amino-2,4-dibromoanthraquinone,
1-Amino-2,4-dichloroanthraquinone,
Sodium 1-amino-4-bromoanthraquinone-2-sulfonate,
1,5-Diamino-2,4,6,8-tetrabromoanthraquinone,
1,8-Diamino-2,4,5,7-tetrabromoanthraquinone,
1,5-Dichloro-4,8-dinitroanthraquinone,
1,8-Dichloro-4,5-dinitroanthraquinone,
1,8-Dichloro-4-nitroanthraquinone,
1,5-Dichloro-4-nitroanthraquinone,
1-Chloro-5 or 8-nitroanthraquinone,
1-Amino-5-chloroanthraquinone,
1-Chloro-5-amino-8-hydroxyanthraquinone,
1-Chloro-5-benzoylamino-8-hydroxyanthraquinone,
1-Bromo-4-methylaminoanthraquinone,
1-Bromo-4-ethylaminoanthraquinone.
1-Bromo-4-butylaminoanthraquinone.
1-Anilino-4-bromoanthraquinone,
1-Amino-4-bromoanthraquinone-2-carboxylic acid.
1-Bromo-4-hydroxyanthraquinone,
N-acetyl-1-methylamino-4-bromoanthraquinone.
N-benzoyl-1-methylamino-4-bromoanthraquinone.
Examples of the amide compound (3) are as follows:

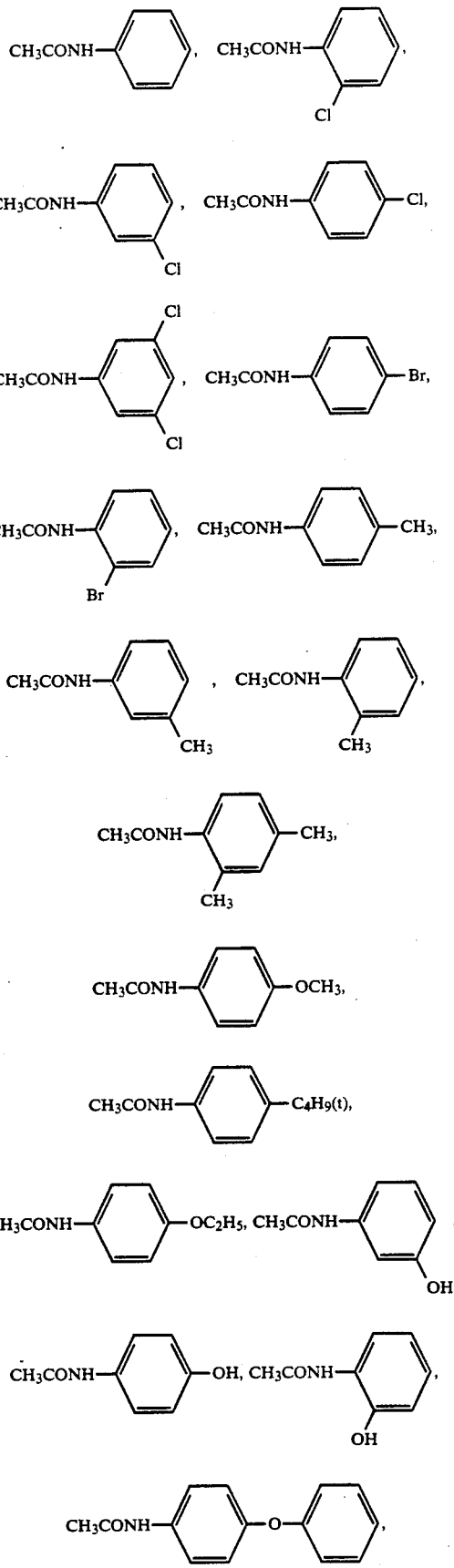

-continued
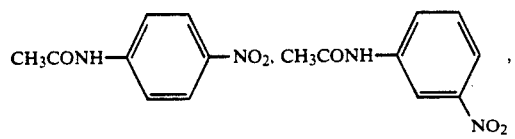 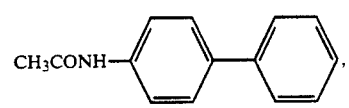
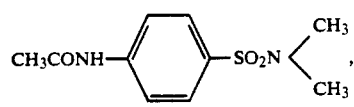 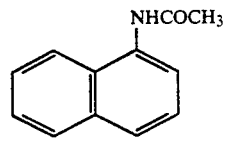
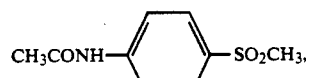 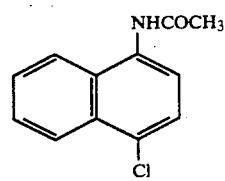
 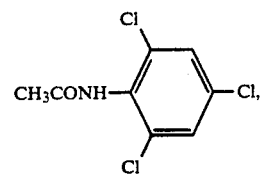
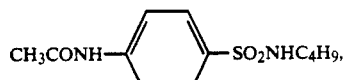 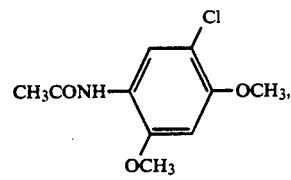
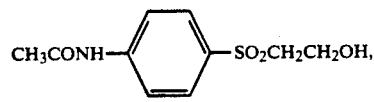 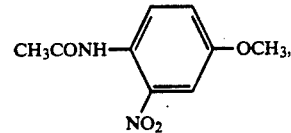
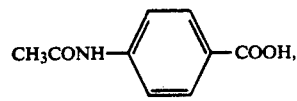 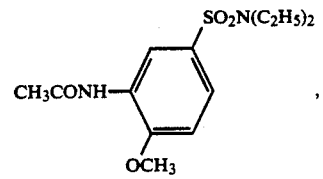
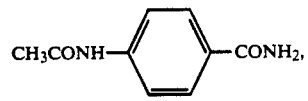
 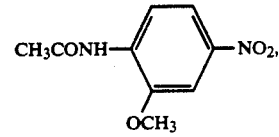
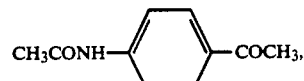 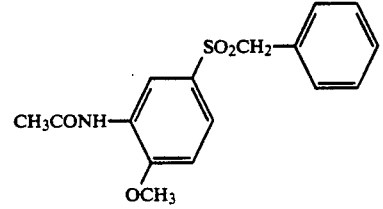
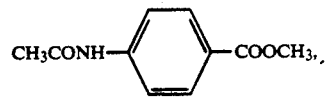
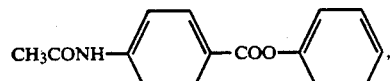

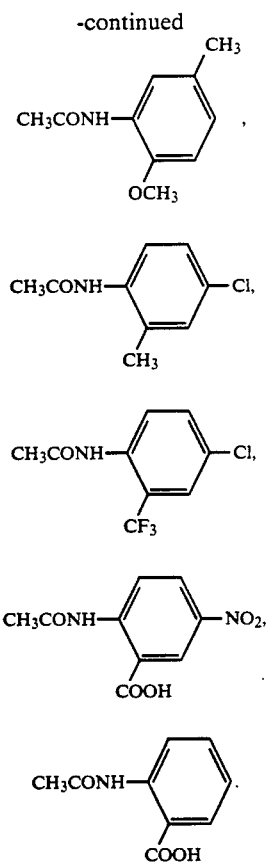

The ring closure reaction of the compound represented by the formula (4) is carried out in water or an organic solvent, preferably in the presence of an alkali. This ring closure reaction can be carried out, preferably at a temperature of 80°–100° C.

When an alkali metal salt such as potassium carbonate, sodium carbonate, potassium hydrogen-carbonate or sodium hydrogencarbonate is used as the acid-binding agent in the reaction of the compounds of the formulas (2) and (3), the compound represented by the formula (4) which is an intermediate need not be separated and the desired anthrapyridone compound represented by the formula (1) can be directly obtained.

The organic solvents used in the ring closure reaction include alcohols such as isobutanol in addition to those exemplified above for the condensation reaction between the compounds (2) and (3). These may be used each alone or in combination thereof. Besides, they may be used together with water.

As the alkalis, there may be used alkali metal salts such as sodium hydroxide, potassium hydroxide and lithium hydroxide in addition to those exemplified above for the acid-binding agent.

Sulfo-carrying anthrapyridone compounds of the formula (1) may be produced by preparing sulfo-free anthrapyridone compounds in the manner described above, followed by sulfonation thereof using sulfuric acid.

The anthrapyridone compound represented by the formula (I) can be produced by any process known per se, particularly by the process of the present invention described above with advantages from industrial view point.

The anthrapyridone compounds of the formula (1) including those of the formula (I) are useful as coloring agents for synthetic resins and acid dyes.

Resins to which the compound of the present invention can be applied as a coloring agent include thermoplastic resins such as polystyrene, polymethyl methacrylate, polyvinyl chloride, acrylonitrile/butadiene/styrene copolymer (ABS resin), acrylonitrile/styrene copolymer (AS resin), polycarbonate, polyphenylene oxide, polypropylene, polyethylene, polyacrylonitrile, polyamide, polyacetal, polyethylene terephthalate, and polybutylene terephthalate and thermosetting resins such as phenolic resin, urea resin, melamine resin, unsaturated polyester resin, epoxy resin and diallyl phthalate resin.

Among them, preferred are acrylonitrile/butadiene/styrene copolymer (ABS resin), acrylonitrile/styrene copolymer (AS resin), polypropylene and polyethylene resin.

Coloring of the resin can be carried out in a manner known per se. For example, the resin in the form of pellet, powder or the like, and if desired, additives usually used are mixed in a mixer with the coloring agent prepared by finely pulvelizing the present anthrapyridone compound, and then the mixture is treated in a kneader, roll mill, Banbury mixer, extruder or the like until the coloring agent is dissolved or dispersed in the resin, whereby a desired colored resin can be obtained. If desired, the colored resin can be subjected to molding such as compression, injection, exturion or blow to obtain molded articles.

Alternatively, the coloring agent can be added to a monomer containing a suitable polymerization catalyst, followed by polymerization to obtain a colored thermoplastic or thermosetting resin. The resulting colored resin can be molded in the manner described above.

Amount of the coloring agent to be added is not critical, but 0.01–5% by weight, preferably 0.01–1% by weight based on the weight of the resin from economical point.

As the additives, other dyes and pigments usually used for coloring resins can be used. For example, opaque colored articles can be obtained by adding 0.1 to 1% by weight of titanium dioxide as the additive.

Moreover, the anthrapyridine compounds of the formula (1) are useful as intermediates for the production of various dyes including disperse dyes for polyester fibers, and various pigments.

The anthrapyridone compound of the present invention represented by the formula (I) can be characterized by a fluorescent color, excellent resistance properties such as heat resistance, light resistance, extraction resistance, sublimation resistance and bleed resistance, and excellent compatibility with the resin (anti-agglomeration property), particularly when used as the coloring agent.

The present invention is explained in more detail by the following nonlimiting Examples. In Examples, parts are by weight.

EXAMPLE 1

A mixture of 1-bromo-4-methylaminoanthraquinone (16 parts) of the following formula:

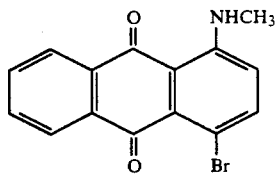

and m-chloroacetoanilide (12.7 parts) of the following formula:

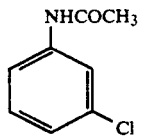

was heated at 135°–145° C. for 25 hours in o-dichlorobenzene in the presence of metallic copper (powder, 0.3 part) and potassium carbonate (17.3 parts). After cooling, the resulting precipitate was filtrated, washed with methanol and then water and dried to obtain a cake (13.5 parts, yield 70%) of anthrapyridone compound of the following formula:

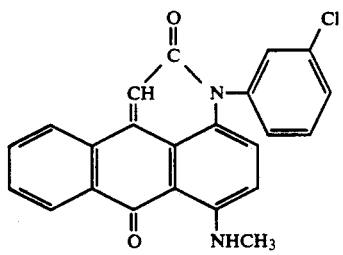

This compound showed a single red spot when thin-layer-chromatographed and λ max (in N,N-dimethylformamide) of 547 nm and had a melting point of 281°–284° C. (uncorrected).

The anthrapyridone compound obtained (0.25 part) was blended with ABS resin (500 parts) and the resulting blend was subjected to coloring at 205° C. using an extruder to obtain colored pellets.

The pellets were molded at the cycle of 230° C.×1 minute using an injection molding machine to obtain a plate-like molded article colored in red with fluorescence. Even when the injection molding was carried out at the cycle of 270° C.×3 minutes, shade of the resulting plate-like molded product was substantially the same as that obtained above. This demonstrates a superior heat resistance of the compound.

EXAMPLE 2

Example 1 was repeated except that an acetylamine compound of the following formula:

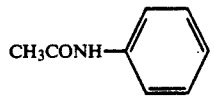

was used in place of the acetylanilide, whereby an anthrapyridone of the following formula:

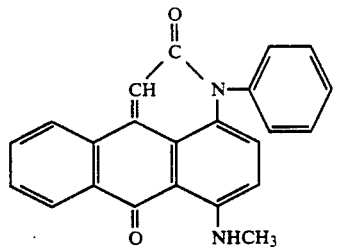

λ max=547 nm; melting point=312°–315° C. uncorrected was obtained.

EXAMPLES 3–12

Anthrapyridone compounds shown in Table 1 were obtained in a manner similar to that of Example 1. Using them, molded articles were prepared also in a manner similar to that of Example 1. Shade of the articles obtained is shown in the right column of Table 1.

TABLE 1

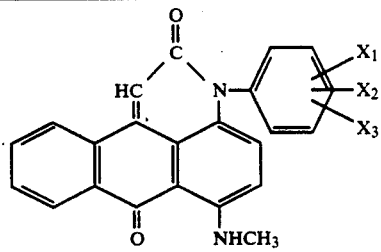

| Example No. | $X_1$ | $X_2$ | $X_3$ | Shade |
| --- | --- | --- | --- | --- |
| 3 | P—$SO_2N(CH_3)_2$ | H | H | Bluish red with fluorescence |
| 4 | P—Cl | H | H | Red with fluorescence |
| 5 | P—$OCH_3$ | H | H | " |
| 6 | P—$CH_3$ | H | H | " |
| 7 | P—$SO_2CH_3$ | H | H | " |
| 8 | m—$CONH_2$ | H | H | " |
| 9 | m—Cl | m—Cl | H | " |
| 10 | O—$CH_3$ | H | H | " |
| 11 | $CH_3$ | $CH_3$ | $CH_3$ | " |
| 12 | m—$NHCOCH_3$ | H | H | " |

EXAMPLE 13

A mixture of potassium 1-amino-4-bromo-anthraquinone-2-sulfonate (20 parts) of the following formula:

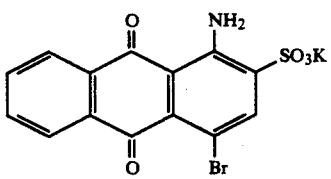

and m-chloroacetanilide (12.7 parts) of the following formula:

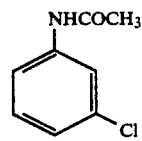

was heated at 115°–120° C. for 20 hours in sulfolane in the presence of metallic copper (powder, 0.3 part) and potassium carbonate (17.3 parts). After cooling, the resulting precipitate was filtrated to obtain a compound of the following formula:

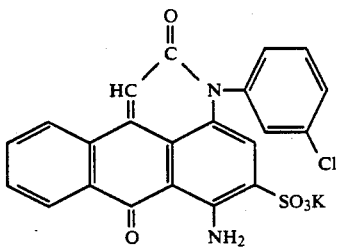

Wool was dyed with the above compound by conventional method. The wool was dyed in vivid orange color.

The resulting wet cake was dissolved in water (150 parts) and reduced with glucose at 60°–70° C. A cake obtained was purified with acetone to obtain anthrapyridone of the following formula:

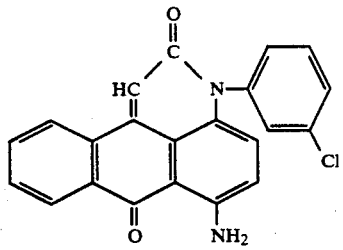

This compound showed a single orange spot when thin-layer-chromatographed and λ max (in N,N-dimethylformamide) of 524 nm.

The compound obtained was molded in the same manner as in Example 1 to obtain a plate-like molded article colored in orange having fluorescence. This compound was superior in heat resistance as in Example 1.

EXAMPLE 14

Example 13 was repeated except that 1-amino-4-bromoanthraquinone-2-carboxylic acid was used in place of potassium 1-amino-4-bromoanthraquinone-2-sulfonate, whereby a compound of the following formula which is useful as a raw material or an intermediate was obtained.

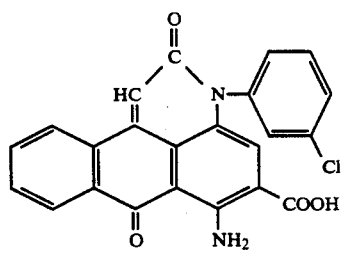

When carboxylic acid portion of this compound was esterified with a lower alcohol by conventional method, the resulting ester dyed polyester fibers in fast red color.

EXAMPLE 15

A mixture of a compound (19.0 parts) of the following formula:

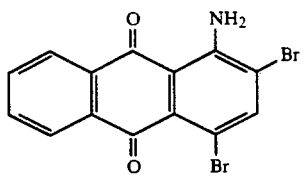

and p-chloroacetoanilide (12.7 parts) of the following formula:

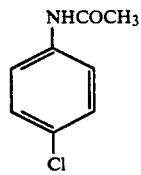

was heated at 140°–145° C. for 25 hours in o-dichlorobenzene in the presence of metallic copper (powder, 0.3 part) and potassium carbonate (17.3 parts). After cooling, the resulting precipitate was filtrated, washed with methanol, then with water and dried to obtain an anthrapyridone compound of the following formula:

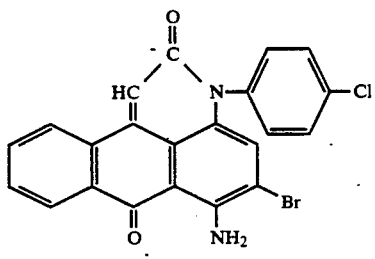

EXAMPLE 16

Example 15 was repeated except that 1-amino-2,4-dichloroanthraquinone was used in place of 1-amino-2,4-dibromoanthraquinone, whereby the following compound was obtained which had the similar properties to those of the compound obtained in Example 15.

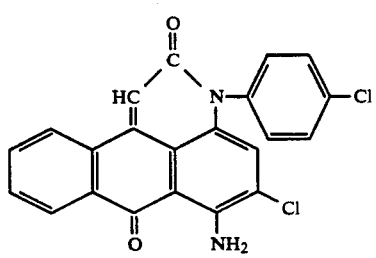

EXAMPLE 17

Example 15 was repeated except that 1-amino-2-methyl-4-bromoanthraquinone was used in place of 1-amino-2,4-dibromoanthraquinone, whereby the following compound was obtained which had the similar properties to those of the compound obtained in Example 15.

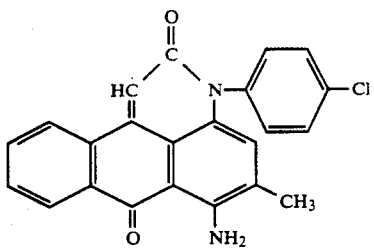

EXAMPLE 18

Reaction was carried out in the same manner as in Example 1 except that an acetylamine of the following formula:

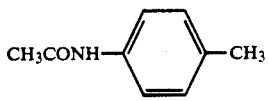

was used in place of the acetylamine compound used in Example 1, cuprous chloride was used in place of copper powder and sodium hydrogencarbonate was used in place of potassium carbonate. After cooling, the resulting precipitate was filtrated, washed with methanol and then water and dried to obtain an anthraquinone compound of the following formula:

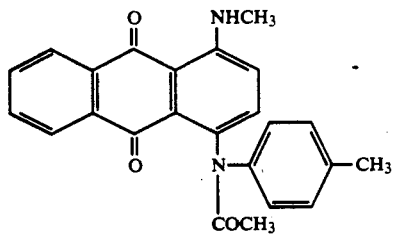

This compound was totally dispersed in 100 parts of 2.8% aqueous potassium hydroxide solution and heated at 115°-120° C. for 10 hours. After cooling, the resulting precipitate was filtrated, washed with water and dried to obtain a cake. This cake was purified with 70% sulfuric acid to obtain an anthrapyridone compound of the following formula:

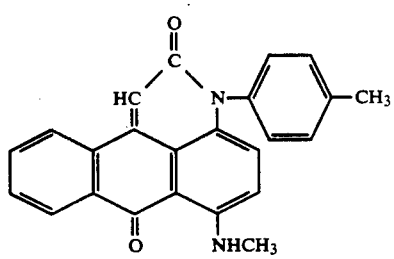

EXAMPLE 19

The anthrapyridone compound (18.3 parts) obtained in Example 18 was added to 5% fuming sulfuric acid (120 parts), followed by stirring at 20°-25° C. This was introduced into water (500 parts) and the resulting precipitate was filtrated and washed with water to obtain a compound of the following formula:

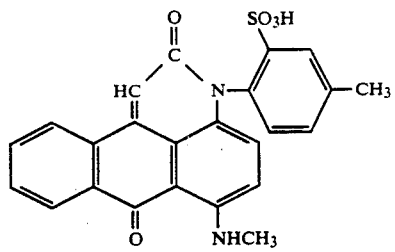

Wool was dyed with this cake by conventional method. The wool was dyed in clear yellowish red color.

EXAMPLE 20

An anthrapyridone compound (20.8 parts, yield 87.2%) of the following formula was obtained in the same manner as in Example 1 except that 1-bromo-4-benzoylaminoanthraquinone (20.7 parts) was used in place of 1-bromo-4-methylaminoanthraquinone and p-chloroacetanilide (13.1 parts) was used in place of m-chloroacetanilide.

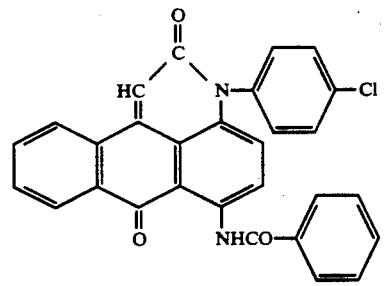

This compound showed a single yellow spot when thin-layer chromatographed and a λ max (in N,N-dimethylformamide) of 464 nm and had a melting point of 300° C. or higher.

Then, the anthrapyridone compound obtained (0.25 part) was blended with ABS resin (500 parts) and the blend was subjected to coloring at 205° C. using an extruder, whereby colored pellets were obtained.

The pellets obtained were molded at the cycle of 230° C.×1 minute using an injection molding machine to obtain a transparent plate-like molded article of yellowish red color having fluorescence. Even when the injection molding was carried out at the cycle of 270° C.×3 minutes, shade of the resulting plate-like molded article was substantially the same as that obtained above. This demonstrates a superior heat resistance of the compound.

EXAMPLE 21

Example 20 was repeated except that in place of the acetanilide used therein was used an acetanilide compound of the following formula:

, whereby an anthrapyridone compound of the following formula and having the similar properties to those of the compound obtained in Example 20 was obtained.

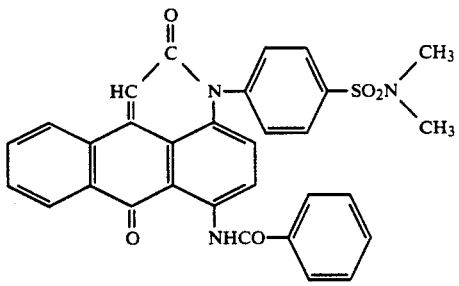

EXAMPLES 22-27

Anthrapyridone compounds shown in Table 2 were obtained in a manner similar to that of Example 20. Using them, colored molded articles were prepared in a manner similar to that of Example 1. Shade of the resulting molded articles is shown in the right column of Table 2.

TABLE 2

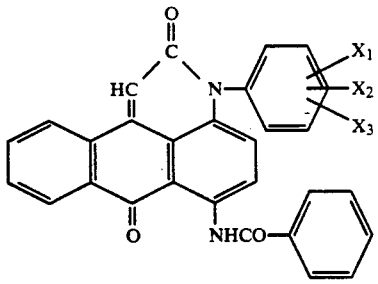

| Example No. | $X_1$ | $X_2$ | $X_3$ | Shade |
| --- | --- | --- | --- | --- |
| 22 | P—Cl | H | H | Yellow with fluorescence |
| 23 | P—OCH$_3$ | H | H | Yellow with fluorescence |
| 24 | P—CH$_3$ | H | H | Yellow with fluorescence |
| 25 | P—NO$_2$ | H | H | Yellow with fluorescence |
| 26 | m-CONH$_2$ | H | H | Yellow with fluorescence |
| 27 | —CH$_3$ | —CH$_3$ | —CH$_3$ | Yellow with fluorescence |

EXAMPLE 28

Anthrapyridone compound (10 parts) obtained in Example 21 and having the following formula:

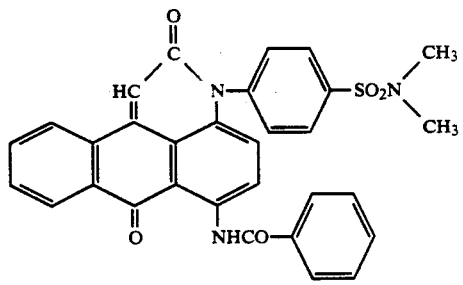

was subjected to treatment in 65% sulfuric acid at 90° C. for 3 hours. The resulting precipitate was filtrated, washed with water and dried to obtain an anthrapyridone compound (6.1 parts) of the following formula:

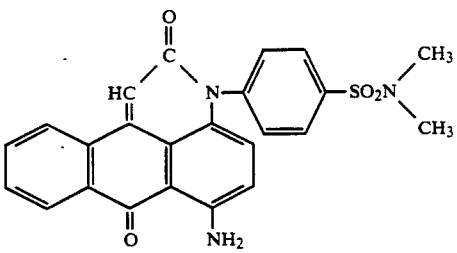

This compound showed a single orange spot when thin-layer chromatographed and had a λ max of 523 nm (in N,N-dimethylformamide). This was molded by the method used in Example 1 to obtain a plate-like molded article of orange color having fluorescence. This compound was superior in heat resistance as in Example 1.

EXAMPLES 29 to 32

Anthrapyridone compounds shown in Table 3 were obtained in a manner similar to that of Example 28. Using them, colored resin molded articles were prepared in a manner similar to that of Example 1. Shade of the obtained articles is shown in the right column of Table 3.

TABLE 3

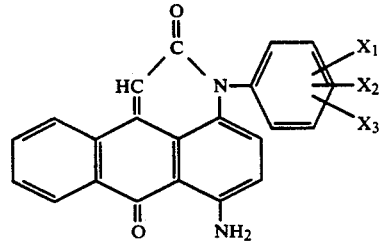

| Example No. | $X_1$ | $X_2$ | $X_3$ | Shade |
| --- | --- | --- | --- | --- |
| 29 | P—Cl | H | H | Orange with fluorescence |
| 30 | P—OCH$_3$ | H | H | Orange with fluorescence |
| 31 | P—CH$_3$ | H | H | Orange with fluorescence |
| 32 | —CH$_3$ | —CH$_3$ | —CH$_3$ | Orange with fluorescence |

What is claimed is:

1. An anthrapyridone compound represented by the following formula:

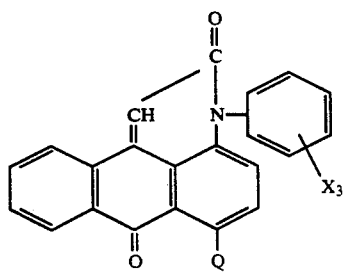

wherein Q is NH$_2$, NHCH$_3$, or

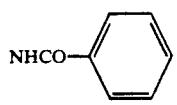

and X₃ is —NHCOR¹ or —SO₂NR⁷R⁸ wherein R¹, R⁷ and R⁸ are each $C_{1-4}$ alkyl.

2. An anthrapyridone compound according to claim 22, wherein the compound is represented by the formula (II),

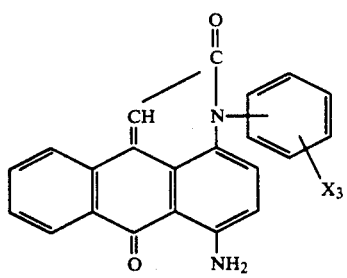

wherein X₃ is as defined in claim 22.

3. An anthrapyridone compound according to claim 2, wherein the alkyl is methyl.

4. An anthrapyridone compound according to claim 22, wherein the compound is represented by the formula (III),

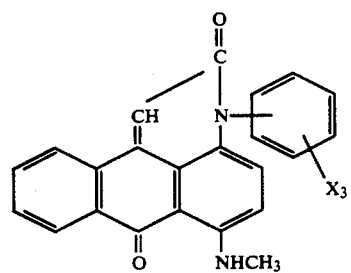

wherein X₃ is as defined in claim 22.

5. An anthrapyridone compound according to claim 4, wherein the alkyl is methyl.

6. An anthrapyridone compound according to claim 1, wherein the compound is represented by the formula (IV),

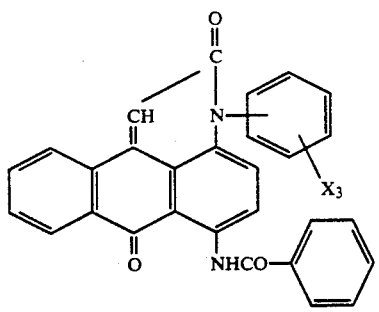

wherein X₃ is as defined in claim 22.

7. An anthrapyridone compound according to claim 6, wherein the alkyl is methyl.

8. A compound of the following formula,

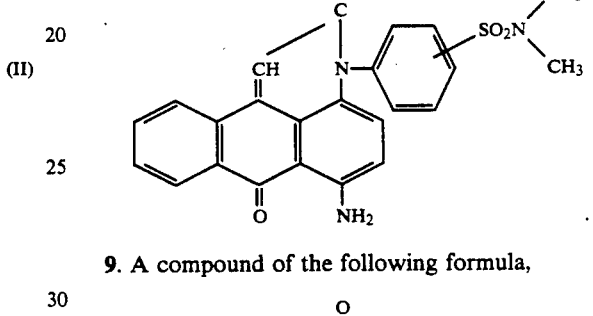

9. A compound of the following formula,

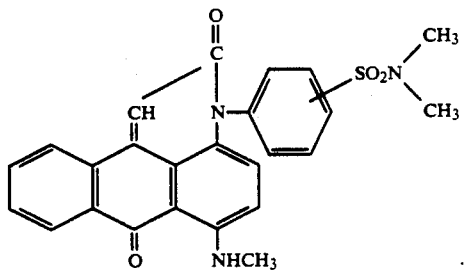

10. A compound of the following formula,

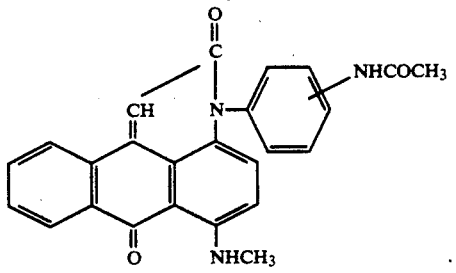

11. A compound of the following formula,

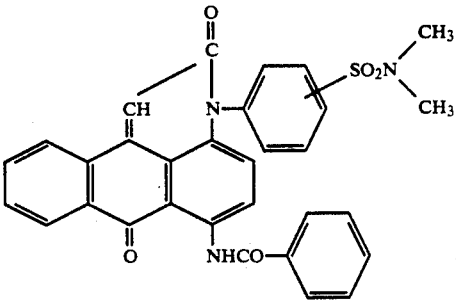

* * * * *

UNITED STATES PATENT AND TRADEMARK OFFICE
CERTIFICATE OF CORRECTION

PATENT NO. : 5,183,892
DATED : February 2, 1993
INVENTOR(S) : Toshio Nakamatsu et al It is certified that error appears in the above-identified patent and that said Letters Patent is hereby corrected as shown below:

Title page,
In item "[73] Assignees: ", delete "Daiei Chemical Company, Limited, Hyogo" and insert therefor -- Sumika Fine Chemical Co., Ltd., Osaka --

Signed and Sealed this

Twenty-sixth Day of April, 1994

*Attest:*

BRUCE LEHMAN

*Attesting Officer*            Commissioner of Patents and Trademarks